United States Patent [19]
Miller et al.

[11] Patent Number: 5,347,129
[45] Date of Patent: Sep. 13, 1994

[54] SYSTEM FOR DETERMINING THE TYPE OF NUCLEAR RADIATION FROM DETECTOR OUTPUT PULSE SHAPE

[75] Inventors: William H. Miller; Ronald R. Berliner, both of Columbia, Mo.

[73] Assignee: University of Missouri-Columbia, Columbia, Mo.

[21] Appl. No.: 48,272

[22] Filed: Apr. 14, 1993

[51] Int. Cl.$^5$ .............................. G01T 1/00; G01T 1/15
[52] U.S. Cl. ................................ 250/336.1; 250/369; 250/370.06; 250/390.07
[58] Field of Search ..................... 250/336.1, 362, 364, 250/367, 369, 390.07, 370.05, 370.06; 364/524, 527

[56] References Cited

U.S. PATENT DOCUMENTS

| | | | |
|---|---|---|---|
| 3,898,463 | 8/1975 | Noakes et al. | 250/369 X |
| 3,988,586 | 10/1976 | Stuart et al. | 250/390.11 |
| 4,217,496 | 8/1980 | Daniels et al. | 250/370.07 X |
| 4,217,497 | 8/1980 | Daniels et al. | 250/370.07 X |
| 4,454,587 | 6/1984 | Kiefer et al. | 364/527 |
| 5,264,702 | 11/1993 | Mihaiczo | 250/390.01 X |

FOREIGN PATENT DOCUMENTS

| | | | |
|---|---|---|---|
| 2-74890 | 3/1990 | Japan | 250/367 |

OTHER PUBLICATIONS

Oikari et al., 'Simultaneous Counting of Low Alpha- and Beta-Particle Activities with Liquid-Scintillation Spectrometry and Pulse-Shape Analysis', Appl. Radiat. Isot., vol. 38, No. 10, pp. 875-878, 1987.
Nuclear Instruments and Methods in Physics Research A290 (1990) 445-449.
Nuclear Instruments and Methods in Physics Research B62 (1991) 289-292.

*Primary Examiner*—Constantine Hannaher
*Assistant Examiner*—Edward J. Glick
*Attorney, Agent, or Firm*—Hovey, Williams, Timmons & Collins

[57] ABSTRACT

A radiation detection system determines the type of nuclear radiation received in a detector by producing a correlation value representative of the statistical cross correlation between the shape of the detector signal and pulse shape data previously stored in memory and characteristic of respective types of radiation. The correlation value is indicative of the type of radiation. The energy of the radiation is determined from the detector signal and is used to produce a spectrum of radiation energies according to radiation type for indicating the nature of the material producing the radiation.

17 Claims, 1 Drawing Sheet

SYSTEM FOR DETERMINING THE TYPE OF NUCLEAR RADIATION FROM DETECTOR OUTPUT PULSE SHAPE

This invention was made with Government support under Grant No. DE-FG02-92ER75704, DOE Case No. S-76,993, awarded by the Department of Energy. The Government has certain rights in the invention.

BACKGROUND OF THE INVENTION

1. Field of the Invention

The present invention relates to the field of nuclear pulse spectroscopy. More particularly, the invention concerns a system that determines the type of nuclear radiation received in a detector by producing a correlation value representative of the statistical cross correlation between the shape of the detector signal and pulse shape data previously stored in memory and characteristic of respective types of radiation. Additionally, the system determines the energy of the radiation by digital integration of the pulse shape.

2. Description of the Prior Art

In the field of nuclear pulse spectroscopy, various types of detectors have been used including scintillation detectors such as Phoswich and NaI detectors, gas filled detectors, and solid state detectors such as SiLi and intrinsic germanium. These detectors are operable for producing electrical output pulses having shapes characteristic of the type of radiation detected such as alpha and beta particles, gamma rays and neutrons.

Various techniques have been used to characterize the shapes of the output pulses including analyses of the time-to-peak and time-from-peak of the waveforms, and pulse energy based upon pulse height. While helpful, the prior art techniques have not been fully adequate for discriminating between the various types of pulse shapes and accurately determining pulse energy. Additionally, the prior art techniques have not been able to produce analyses with the speed required for practical application, especially for producing a spectral analysis for determining the types of materials producing the nuclear emissions.

SUMMARY OF THE INVENTION

The present invention solves the prior art problems discussed above and provides a distinct advance in the state of the art. More particularly, the system hereof provides rapid and accurate discrimination between types of nuclear radiation pulses and determination of the pulse energies produced by a detector.

An apparatus in accordance with the present invention includes a nuclear radiation detector for producing detector signals characteristic of the radiation including the type of radiation, and a signal processor for determining the type and energy of radiation from the detector signals. In preferred forms, the signal processor includes memory for storing sets of pulse shape data wherein each set is characteristic of a type of radiation. The signal processor is operable for producing correlation values representative of the statistical cross correlation between the detector signal and the respective pulse shape data sets. The highest correlation value exceeding a predetermined minimum is indicative that the radiation is of the type characterized by the associated data set.

DETAILED DESCRIPTION OF THE PREFERRED EMBODIMENT

Figure 1:
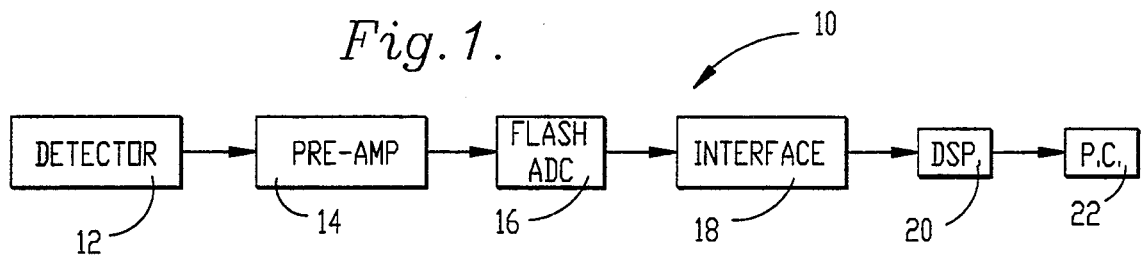
FIG. 1 is a schematic representation of the preferred apparatus of the present invention.

FIG. 1 is a schematic representation of apparatus 10 including nuclear radiation detector 12, conventional pre-amplifier 14, analog-to-digital converter (ADC) 16, interface 18 including the capability of pulse threshold trigger and a first-in, first-out (FIFO) shift register, digital signal processor (DSP) 20, and personal computer 22. Apparatus 10 can be used in connection with a wide variety of nuclear radiation detectors such as the type of Phoswich scintillation detector used in the Harshaw TASC-12-A6 system or a proton recoil neutron detector such as the Ludlum 270 series proportional counter.

Preferred ADC 16 is a so-called "flash" converter operable for rapid digital conversion of the input analog pulse from detector 12 such as types AD9005 (12 bit, 10 MHz), CAV1220 (12 bit, 20 MHz) or 9020 (10 bit, 60 Mhz) available from Analog Devices. Preferred interface 20 uses a digitally adjustable threshold trigger operable for forwarding data when exceeding a predetermined threshold to a conventional FIFO shift register such as type IDT-72225 (18 bit, 50 Mhz, 1 K bytes) or TI-SN74ACT-7801-20 (18 bit, 50 MHz, 1 K bytes).

DSP 20 is preferably type TMS320C40 (32 bit, 25 MHz, 275 mflops) available from Texas Instruments or DSP96002 (32 bit, 27 MHz, 40 mflops) available from Motorola. Preferred PC 22 is a 486-based, 50 MHz, EISA personal computer having sufficient memory capacity for storing pulse shape data and spectrum data for the particular application of apparatus 10.

Figure 2:
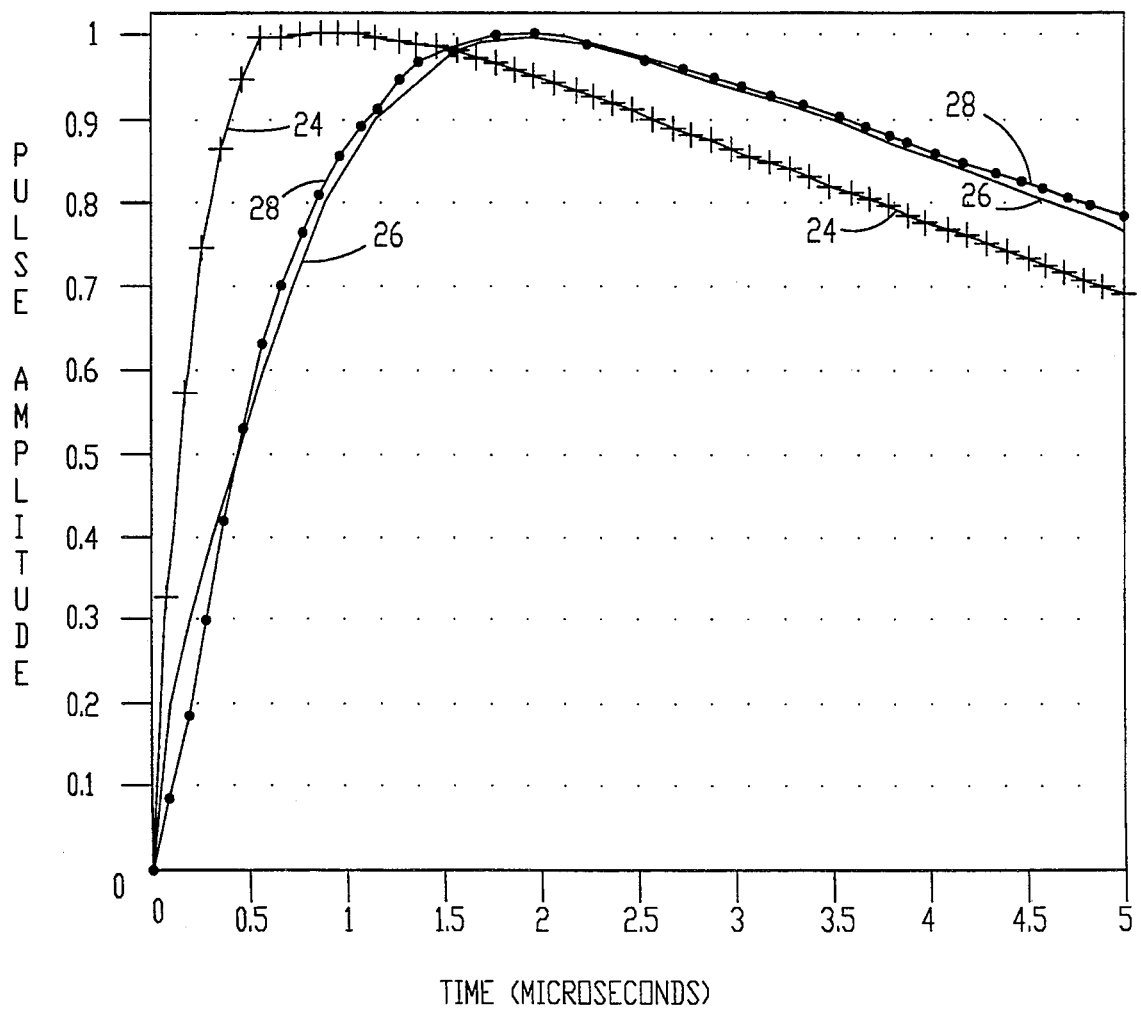
FIG. 2 is a graph of two types of characteristic radiation pulses and a detected pulse produced by the detector of FIG. 1.

The memory of PC 22 includes sets of pulse shape data stored therein with each set being characteristic of a type of radiation. Specifically, each pulse shape data set includes a set of data points representing the shape of a curve wherein that shape is characteristic of the shape of a pulse produced by detector 12 in response to reception to a particular type of radiation. For example, FIG. 2 is a graph of pulse amplitudes over time with curve 24 representing the pulse shape caused by reception of a neutron by detector 12, and with curve 26 representing that of a gamma ray. Data sets representing curves 24 and 26 are stored in memory of PC 22 along with data sets representative of other types of radiation such as alpha and beta particles and protons. Curve 28 is a plot of digitized pulse data of a pulse produced by detector 12 in response to reception of an unknown type of radiation to be analyzed.

In operation, detector 12 produces a detector signal in the nature of an analog pulse having a shape characteristic of the nuclear radiation that was detected. The detector signal is amplified by pre-amplifier 14 and then provided as input to ADC 16, which converts the detector signal into a digital data format. A "flash" ADC is preferred in order to provide a very rapid sampling rate and thereby provide high resolution for discrimination between different types of pulses.

As mentioned above, interface 18 provides an adjustable threshold trigger. By adjusting the trigger as appropriate for the detector and other conditions, apparatus 10 can distinguish between genuine pulses and noise, detector bias or artifacts. In this way, digitized pulse data exceeding the threshold reliably indicates the beginning of a genuine pulse. The pulse data is forwarded to the FIFO which responds to the trigger by clocking in a fixed number of data points. This provides an advantage because subsequent analyses need only deal with uniform blocks of data, which improves the speed of operation and practicality of apparatus 10. Thus, the number of data points is the same for the pulse under investigation and each of the pulse shape data sets stored in the memory of PC 22.

DSP 20 receives the block of digitized pulse data and, in cooperation with PC 22, begins the analysis process. More particularly, DSP 20 retrieves from the memory of PC 22 each of the pulse shape data sets and analyzes the data points in each of these sets with respect to the data points representing the detector signal.

The analysis performed by DSP 20 is in the form of a statistical cross correlation between the data points of the detector signal pulse data and the retrieved data set to produce a corresponding correlation value. Correlation indicates the degree of interrelationship between variables. This interrelationship may be found in two ways:
1. A least squares fit of a straight line: $z = a_0 + a_1 x$
2. A least squares fit of another line: $x = a_{0'} + a_{1'} z$
In the first case, $\Delta z$ errors are minimized:

$$a_1 = \frac{\frac{1}{N} \sum_{j=1}^{N} (x_j - \bar{x})(z_j - \bar{z})}{\sigma_x^2}$$

In the second case, $\Delta x$ errors are minimized:

$$a_{1'} = \frac{\frac{1}{N} \sum_{j=1}^{N} (x_j - \bar{x})(z_j - \bar{z})}{\sigma_z^2}$$

If x and z were perfectly correlated, then $a_1 a_{1'} = 1$. On the other hand, if x and z are completely uncorrelated then $a_1 a_{1'} = 0$.

The normalized cross correlation coefficient can be defined as the square root of the product $a_1 a_{1'}$ which equals the correlation value $C_{xz}$. This correlation value can be determined by substituting the two equations from above for $a_1$ and $a_{1'}$ respectively as:

$$C_{xz} = \sqrt{a_1 a_{1'}}$$

By using cross correlation, it is not necessary to scale the amplitude of the theoretical curve as represented by the pulse shape data to that of the detector pulse data. This eliminates calculation time as an aid for real-time processing.

In the example of FIG. 2, a correlation value Cn is determined as described above for detector pulse curve 28 versus neutron pulse curve 24, and another correlation value Cg is determined for curve 28 versus gamma curve 26. In this particular example, curve 28 shows a high degree of cross correlation of gamma curve 26 and lesser correlation with neutron curve 24.

After a correlation value is determined between the detector pulse data and the pulse shape data, the highest value is selected and analyzed as to whether this highest value exceeds a predetermined threshold. In the preferred embodiment in the example of FIG. 2, this threshold is +0.985. This ensures that a high level of correlation is achieved for an indication that radiation is of the type represented by the particular data set being analyzed.

Next, the difference between the highest value and the next highest value is calculated and then determined whether this difference is greater than a predetermined minimum. This ensures that the detector pulse curve is close enough to a candidate so that sufficient discrimination is achieved for a reliable indication of the type of radiation. If the conditions of high correlation and sufficient difference with the next closest value are not achieved, then the detector pulse is deemed invalid or indeterminate.

Additionally, the pulse shape analysis capability of the present invention enables validation of radiation induced pulses and rejection of pulses arising from noise, pulse overlap or pile-up and other spurious events. In other words, pulses that do not meet the criteria of sufficiently high correlation and differential with respect to other pulses are deemed to be invalid and are rejected.

The following table illustrates a number of additional examples in the use of the present invention where the result N indicates a neutron pulse, G indicates a gamma ray pulse, and I indicates an invalid pulse.

| pulse # | Cn | Cg | result | pulse # | CNR | CGR | result |
| --- | --- | --- | --- | --- | --- | --- | --- |
| 1 | 0.989 | 0.943 | N | 21 | 0.968 | 0.799 | N |
| 2 | 0.971 | 0.824 | N | 22 | 0.997 | 0.896 | N |
| 3 | 0.996 | 0.927 | N | 23 | 0.991 | 0.894 | N |
| 4 | 0.94 | 0.993 | G | 24 | 0.997 | 0.879 | N |
| 5 | 0.984 | 0.857 | N | 25 | 0.951 | 0.777 | N |
| 6 | 0.99 | 0.945 | N | 26 | 0.994 | 0.858 | N |
| 7 | 0.912 | 0.998 | G | 27 | 0.973 | 0.964 | I |
| 8 | 0.914 | 0.998 | G | 28 | 0.993 | 0.888 | N |
| 9 | 0.994 | 0.93 | N | 29 | 0.969 | 0.801 | N |
| 10 | 0.953 | 0.979 | G | 30 | 0.967 | 0.799 | N |
| 11 | 0.932 | 0.993 | G | 31 | 0.997 | 0.896 | N |
| 12 | 0.957 | 0.984 | G | 32 | 0.997 | 0.88 | N |
| 13 | 0.991 | 0.875 | N | 33 | 0.951 | 0.777 | N |
| 14 | 0.972 | 0.963 | I | 34 | 0.994 | 0.858 | N |
| 15 | 0.945 | 0.991 | G | 35 | 0.973 | 0.965 | I |
| 16 | 0.989 | 0.683 | N | 36 | 0.951 | 0.777 | N |
| 17 | 0.99 | 0.864 | N | 37 | 0.994 | 0.858 | N |
| 18 | 0.977 | 0.968 | I | 38 | 0.973 | 0.964 | I |
| 19 | 0.936 | 0.992 | G | 39 | 0.993 | 0.887 | N |
| 20 | 0.924 | 0.995 | G | 40 | 0.969 | 0.801 | N |

The pulse shape data stored in the memory of PC 22 can be derived theoretically as will be appreciated by those skilled in the art. It will also be appreciated that this data can be in the form of a weighted moving average of data derived from actual pulses deemed to be of the type represented by the data set. In this way, apparatus 10 undergoes a self-learning process thereby improving the reliability of the results.

In place of cross correlation, Fourier analyses might be used in certain applications for determining how closely the shape of the detector pulse matches that of predetermined pulse shapes for identifying radiation type. It will also be appreciated that other types of analyses may be used in equivalent fashion.

The memory of PC 22 also includes spectrum data conventionally available for plotting the occurrence frequencies of pulses of the same type versus energy. In so doing, the type of material producing the radiation can be determined by the energy distribution. In order to accomplish this, DSP 20 is preferably programmed to calculate the area of each valid detector pulse, such being representative of the energy of that pulse. This technique provides a more accurate indication of radiation energy than the prior art technique, which assumes that the energy is proportional to pulse height. With the energy information derived from a sufficient number of pulses of the same type, the spectrum can be developed.

The present invention encompasses many variations in the preferred embodiment described herein. For example, DSP 20 and PC 22 could be combined into a single unit or in some cases, PC 22 itself may be able to perform both functions. In other situations, it may be desirable to combine all of the components into a single, light weight, portable unit for convenient field testing and operation.

Having thus described the preferred embodiment of the present invention the following is claimed as new and desired to be secured by Letters Patent:

1. An apparatus for determining the presence and type of nuclear radiations comprising:
  detector means for detecting the presence of a nuclear radiation and, in response, for producing a detector signal representative thereof, said detector signal having a shape characteristic of the radiation including the type of radiation; and
  signal processing means including means for receiving said detector signal and responsive thereto for determining the type of the radiation, said signal processing means including
    memory means for storing a reference pulse shape digital data set characteristic of a type of radiation,
    means for producing a detector pulse shape digital data set representative of the shape of said detector signal, and
    value producing means for producing a correlation value representative of the statistical cross correlation between said detector pulse shape digital data set and said reference pulse shape digital data set, said correlation value being indicative of whether the nuclear radiation is said type of radiation characterized by said reference pulse shape digital data set.

2. The apparatus as set forth in claim 1, said memory means including means for storing a plurality of reference pulse shape digital data sets with each set being characteristic of a type of radiation, said value producing means including means for producing a plurality of correlation values representative of the statistical cross correlation between said detector pulse shape digital data set and a respective plurality of said reference pulse shape digital data sets, the highest of said correlation values being indicative that the radiation is of the type characterized by the associated reference pulse shape digital data set.

3. The apparatus as set forth in claim 2, said signal processing means further including means for determining whether said highest correlation value exceeds a predetermined minimum value, said correlation value being indicative of said type of radiation only if said correlation value exceeds said minimum value.

4. The apparatus as set forth in claim 2, said signal processing means further including means for determining whether said highest correlation value exceeds the next highest correlation value by a predetermined difference, said highest correlation value being indicative of said type of radiation only if said highest correlation value exceeds the next highest correlation value by said predetermined difference.

5. The apparatus as set forth in claim 2, said signal processing means further including means for determining the amount of radiation energy represented by said detector signal, said apparatus further including means for producing a spectrum of radiation energies by radiation type, said spectrum being indicative of the material producing the radiation.

6. The apparatus as set forth in claim 1, said detector means including one of a scintillation detector, a solid state detector and a gas filled detector.

7. The apparatus as set forth in claim 1, said type of radiations including at least one of neutrons, alpha radiations, beta radiations, and gamma rays.

8. The apparatus as set forth in claim 1, said means for producing a detector pulse shape digital data set including means for producing said data set as a fixed number of data points.

9. The apparatus as set forth in claim 1, said means for producing a detector pulse shape digital data set including means for producing said data set only when said detector signal exceeds a threshold trigger.

10. The apparatus as set forth in claim 9, said threshold trigger being adjustable.

11. A method of determining the presence and type of a nuclear radiation comprising:
  in a nuclear radiation detector, detecting the presence of a nuclear radiation and, in response, producing a detector signal representative thereof, said detector signal having a shape characteristic of the radiation including the type of radiation; and
  in a signal processor, receiving said detector signal and, in response, determining the type of the radiation, said determining step including the steps of
    storing a reference pulse shape digital data set characteristic of a type of radiation in a memory device,
    producing a detector pulse shape digital data set representative of the shape of said detector signal, and
    producing a correlation value representative of the statistical cross correlation between said detector pulse shape digital data set and said reference pulse shape digital data set, said correlation value being indicative of whether the nuclear radiation is said type of radiation characterized by said reference pulse shape digital data set.

12. The method as set forth in claim 11, said step of producing a detector pulse shape digital data set including the step of producing said data set as a fixed number of data points.

13. The method as set forth in claim 11, said step of producing a detector pulse shape digital data set including the step of producing said data set only when said detector signal exceeds a threshold trigger.

14. The method as set forth in claim 13, said threshold trigger being adjustable.

15. An apparatus for determining the presence and type of nuclear radiations comprising:
   detector means for detecting the presence of a nuclear radiation and, in response, for producing a detector signal representative thereof, said detector signal having a shape characteristic of the radiation including the type of radiation; and
   signal processing means including means for receiving said detector signal and responsive thereto for determining the type of the radiation, said signal processing means including
   memory means for storing a reference pulse shape digital data set representative of a reference pulse and characteristic of a type of radiation,
   means for producing a detector pulse shape digital data set representative of the shape of said detector signal, and
   value producing means for producing a value representative of how closely said reference pulse shape digital data set matches said detector pulse shape digital data set, said value being indicative of whether the nuclear radiation is said type of radiation characterized by said reference data set.

16. The apparatus as set forth in claim 15, said value being a correlation value representative of the statistical cross correlation between said detector pulse shape digital data set and said reference pulse shape digital data set.

17. The apparatus as set forth in claim 15, said value producing means including means for conducting a Fourier analysis of said digital data sets for determining said value.

* * * * *